(12) United States Patent
Ye (10) Patent No.: US 9,350,650 B2
(45) Date of Patent: May 24, 2016

(54) SWITCHING TO A BACKUP TRAFFIC PATH BY A LABEL SWITCHING ROUTER IN A MULTI-PROTOCOL LABEL SWITCHING NETWORK

(75) Inventor: Jinrong Ye, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 160 days.

(21) Appl. No.: 13/979,439

(22) PCT Filed: Mar. 14, 2012

(86) PCT No.: PCT/CN2012/072307
§ 371 (c)(1),
(2), (4) Date: Jul. 12, 2013

(87) PCT Pub. No.: WO2012/122936
PCT Pub. Date: Sep. 20, 2012

(65) Prior Publication Data
US 2014/0010074 A1 Jan. 9, 2014

(30) Foreign Application Priority Data

Mar. 14, 2011 (CN) .......................... 2011 1 0060251

(51) Int. Cl.
*H04L 1/00* (2006.01)
*H04L 12/703* (2013.01)
*H04L 12/723* (2013.01)
*H04L 12/707* (2013.01)

(52) U.S. Cl.
CPC ................ *H04L 45/28* (2013.01); *H04L 45/22* (2013.01); *H04L 45/507* (2013.01)

(58) Field of Classification Search
USPC ......... 370/216, 242, 225, 255, 390, 389, 432, 370/352, 353, 355, 356; 709/250, 238
See application file for complete search history.

(56) References Cited

U.S. PATENT DOCUMENTS 6,907,039 B2 * 6/2005 Shen ........................... 370/400
7,130,926 B1   10/2006 Wu et al.
7,433,966 B2   10/2008 Charny et al.
(Continued)

FOREIGN PATENT DOCUMENTS

CN             1466832      1/2004
CN           101047641     10/2007
(Continued)

OTHER PUBLICATIONS

CN First Office Action dated May 30, 2013 issued on CN Patent Application No. 201110060251.5 dated Mar. 14, 2011, The State Intellectual Property Office, the P.R. China.
(Continued)

*Primary Examiner* — Chi H Pham
*Assistant Examiner* — Alexander O Boakye
(74) *Attorney, Agent, or Firm* — Mannava & Kang, P.C.

(57) ABSTRACT

A label switching router (LSR) and a method of switching data traffic to a predefined backup traffic path by the LSR in an MPLS (multi-protocol label switching) network. The LSR, upon detection of failure of a protected path during an LDP session, maintains an LDP session and forwards data traffic via the backup traffic path according to a forwarding table. The forwarding table contains logical output interface information including an outgoing label, a logical output interface, and the next hop of the predefined backup path.

18 Claims, 5 Drawing Sheets

(56) References Cited

U.S. PATENT DOCUMENTS

| | | | |
|---|---|---|---|
| 7,590,048 B2 | 9/2009 | Doukai | |
| 7,609,620 B2 | 10/2009 | Raj et al. | |
| 7,881,183 B2 | 2/2011 | Wu et al. | |
| 8,040,793 B2 | 10/2011 | Gao et al. | |
| 8,121,134 B2 | 2/2012 | Rijsman | |
| 8,615,009 B1 * | 12/2013 | Ramamoorthi | H04L 45/745 370/389 |
| 2002/0038259 A1 | 3/2002 | Bergman et al. | |
| 2007/0053359 A1 * | 3/2007 | Wu | H04J 3/14 370/392 |
| 2008/0031130 A1 * | 2/2008 | Raj et al. | 370/225 |
| 2008/0192762 A1 | 8/2008 | Kompella | |
| 2010/0189115 A1 | 7/2010 | Kitada | |

FOREIGN PATENT DOCUMENTS

| | | |
|---|---|---|
| CN | 101106486 | 1/2008 |
| CN | 101127718 | 2/2008 |
| CN | 101237409 | 8/2008 |
| CN | 101369958 | 2/2009 |
| CN | 101478474 | 7/2009 |
| CN | 101616091 | 12/2009 |
| CN | 101667970 | 3/2010 |
| CN | 101710899 | 5/2010 |
| CN | 101877677 | 11/2010 |
| CN | 102123097 | 7/2011 |
| WO | WO2006/034639 | 4/2006 |
| WO | WO-2009/077704 | 6/2009 |

OTHER PUBLICATIONS

Extended European Search Report dated Jul. 16, 2014 issued on EP Patent Application No. 12758248.4 dated Mar. 14, 2012, European Patent Office.

Liu, A et al: "RSVP-TE Graceful Restart under Fast Re-route conditions; draft-liu-mpls-rsvp-te-gr-frr-oo.txt", Internet Engineering Task Force, IETF; Standard working draft, Internet Society, Oct. 13, 2009, * p. 3, paragraph Section 3 "Problem Statement"—p. 4 * p. 4, paragraph Section 4 "Extensions to RSVP Hello Mes. Handling"—p. 5 *.

Walsh: "Communication from MPLS Forum on MPLS/Layer 2 control plane interworking; TD 28", ITU-T Draft Study Period 2001-20014, International Telecommunication Union, Geneva ; CH, vol. Study Group 11, Nov. 11, 2002, pp. 1-23, * p. 20, paragraph "Fault-tolerant PNNI signalling between LERs" *.

International Search Report and Written Opinion dated Jun. 28, 2012 issued on PCT Patent Application No. PCT/CN2012/072307 filed on Mar. 14, 2012, The State Intellectual Property Office, the P.R. China.

* cited by examiner

SWITCHING TO A BACKUP TRAFFIC PATH BY A LABEL SWITCHING ROUTER IN A MULTI-PROTOCOL LABEL SWITCHING NETWORK

CLAIM FOR PRIORITY

The present application is a national stage filing under 35 U.S.C. 371 of PCT application number PCT/CN2012/072307, having an international filing date of Mar. 14, 2012, which claims priority to Chinese Patent Application No. 201110060251.5, filed Mar. 14, 2011, the disclosures of which are hereby incorporated by reference in their entireties.

BACKGROUND

Multiprotocol Label Switching (MPLS) is an Internet Task Force (IETF)-specified mechanism that provides for the designation, routing, forwarding and switching of traffic flows through a network. In a MPLS network, each data packets is assigned a label, and each data packet is directed from one network node to the next based on a short path label, rather than a long network address. Under the MPLS framework, data transmission occurs on Label-Switched Paths (LSPs), and LSPs are a sequence of labels at each and every node along a path from a source to the destination. The labels identify virtual links (paths) between distant nodes rather than endpoints. MPLS can encapsulate packets of various network protocols. MPLS supports a range of access technologies, including T1/E1, ATM, Frame Relay and DSL.

Label Distribution Protocol (LDP) is a protocol defined by RFC 5036 of the IETF for the purpose of distributing labels in an MPLS environment. Routers in the MPLS are referred to as label switching routers (LSR) and use LDP to establish LSPs. Routers having an established session are called LDP peers and the exchange of information is bi-directional. LDP is used to build and maintain LSP databases that are used to forward traffic through MPLS networks.

BRIEF DESCRIPTION OF THE DRAWINGS

Example of methods and apparatus to implement backup LDPs will be described below by way of example with reference to the accompanying drawings, in which.

DETAILED DESCRIPTION

Peer Discovery

Neighbors of an MPLS network typically discover each other as LDP neighbors or peers via one of the following two methods:
  Basic Discover Mechanism, which is for discovering local LDP neighbors, i.e., LSRs that are directly connected through a link layer. In this mechanism, an LSR sends an LDP Link Hello message to a multi-cast address 224.0.2 to discover all directly connected neighbors.
  Extended Discover Mechanism, which is for discovering remote LDP neighbors, i.e., LSRs that are not directly connected to a link layer. In this mechanism, an LSR periodically sends an LDP Targeted Hello Message to a specified IP address, so that LSR's corresponding to the specified IP address discover the LDP neighbors.
Session Establishment and Maintenance After discovering the LDP peers, the LSRs will begin to establish a session, and this process includes the following steps:
  1) establishing a transport layer connection, i.e. establishing a TCP connection between LSRs; and
  2) initializing the session between LSRs, and negotiating various parameters involved in the session, such as the LDP version, way of label distribution, values of Keepalive timer, etc.

An established session is maintained among the LDP peers by unceasingly sending Hello messages and Keepalive messages.
LSP Establishment and Maintenance The LDP announces among the LDP peers the binding relation between forward equivalent class (FEC) and the labels through sending of label requests and label mapping messages, thereby establishing an LSP. It will be appreciated that FEC is an important concept in MPLS. MPLS is a type of classified forwarding technology, in which packets having the identical characteristics, the identical destination, or the identical service level and so on, are classified as one class and referred to as a FEC. Packets belonging to the same FEC are processed in the identical manner in MPLS networks. For LDP protocol, FEC is divided generally according to the destination address in the network layer of the packets.
Session Revocation As noted above, an LSR wishing to maintain a neighbouring relationship with a neighbouring LSR will periodically send a Hello message to maintain an LDP session by Hello adjacency. An LDP session will be revoked:
  1) If no new Hello message is received by expiration of the Hello keepalive timer, the Hello adjacency or neighbouring relationship will be deleted. It should be noted that an LDP session may have a plurality of Hello neighbouring relationships. When the last Hello neighbouring relationship on the LDP session is deleted, the LSR will send an informing message to terminate said LDP session.
  2) The LSR determines connectivity of the LDP session through the LDP PDU (which carries one or more LDP messages) transmitted on the LDP session. If, before expiration of the session Keepalive timer, there is no information that needs to be exchanged between the LDP peers, the LSR will send the Keepalive message to the LDP peers to maintain the LDP session. If no LDP PDU is received by expiration of the session Keepalive timer, the LSR will shut down the TCP connection and terminate the LDP session.

3) The LSR can also send a Shutdown message to inform its LDP peer of the termination of the LDP session. Thus the LSR will terminate its session with the LDP peer after receiving the Shutdown message sent by the LDP peer.

LDP Protocol Application

LDP is the most widely used label distribution protocol in MPLS. In a MPLS network, the LDP will usually announce a label to the upstream in a 'hop by hop' manner for a FEC, and the path that an established LSP passes through will usually be consistent with an optimal IP route.

Figure 1:
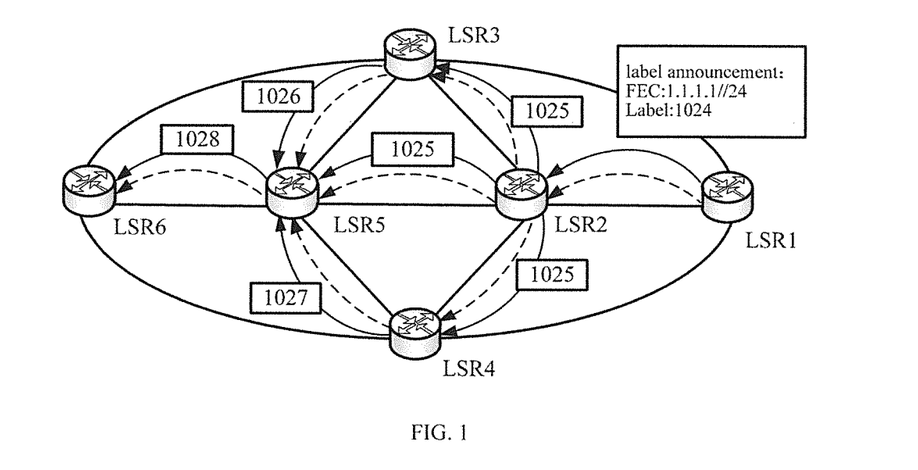
FIG. 1 depicts an example MPLS network comprising a plurality of LSRs with example label announcements.

An example MPLS network depicted in FIG. 1 comprises six LSRs which are identified as LSR1 to LSR6. Assuming that the routing paths between any two LSRs have the same overhead, one of the interface addresses on LSR1 will be discovered by the LDP running on LSR1 as a new FEC. Each FEC is associated with an appropriate label and forwarding path in a LSR.

This example FEC is 1.1.1.1/24 which is one of the interface addresses of LSR1 and is associated with example label 1024. The LDP designates the label 1024 to that FEC and announces the correspondence between the FEC and the label to an upstream LSR, which is LSR2. LSR2 will in turn designate a label to the FEC and announce the label to its upstream LSR, which can be LSR3, LSR4, or LSR5. Likewise, LSR5 will also designate a label to the FEC and announce the label to its upstream LSR, which is LSR6. In general, the entire label announcement process is performed hop by hop, i.e. device by device, as indicated by the dotted arrows of FIG. 1. The announcement of corresponding routings is parallel to the label announcement process, although the announcement of routings is by means of a routing protocol.

Figure 2:
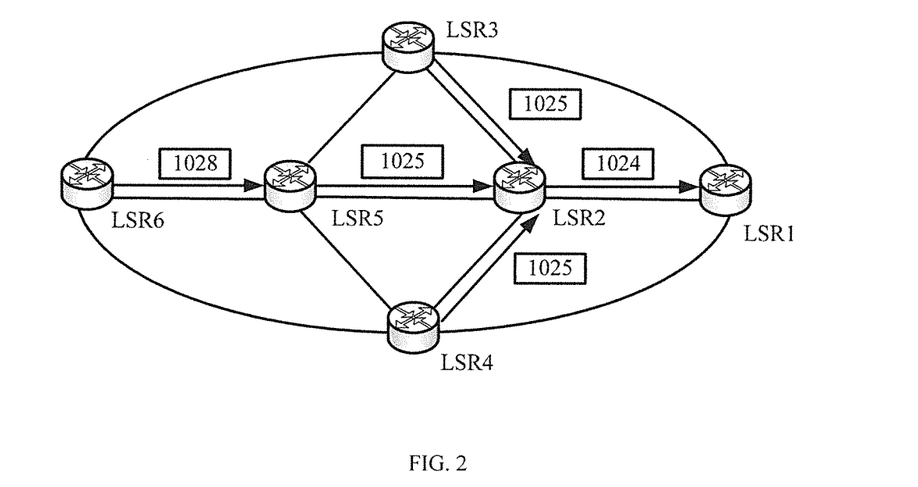
FIG. 2 depicts available LSPs and an example of associated labels for the example network of FIG. 1.

As depicted in FIG. 2, LSR5 will receive three routings and three label announcements from the three downstream devices of LSR2, LSR3 and LSR4. Among the various routings received, only the routing received directly from LSR2 will become the active routing since it is the optimal routing, and the other two routings will not be activated. Similarly, among the label announcements received from the three downstream devices, only the label received from the immediately connected LSR2 is activated, while the other two labels will not be activated. In general, the criterion is to activate an LDP on receipt of labels arriving from downstream stream LSRs only when the sender of the label is the next hop of the most optimal routing of FEC. Where the routings are not used, a general method is to store the label only in the LDP protocol, and no corresponding forwarding information will be generated in the forwarding plane. As a result, the routings will not be used for forwarding. In this case, the LSP established for this FEC:1.1.1.1/24 has no equivalent multi-path load sharing on LSR5, and no backup path is pre-established.

The label received from a next hop device of a non-optimal routing is not only recorded in the LDP protocol, but is also used to build in advance a forwarding table entry in the forwarding plane. This forwarding table entry is known as a 'backup table entry' and is not used for forwarding under normal conditions. An index to the backup table entry is recorded in a main table entry. When the protected path is broken, traffic will be through a backup path defined in the backup table entry. A protection technique known as the Fast-Reroute (FRR) as defined by Request for Comment (RFC) 4090 is commonly used to provide a local bypass route ('Backup LSP') when a failure occurs along a Protected LSP in a MPLS network.

Figure 3:
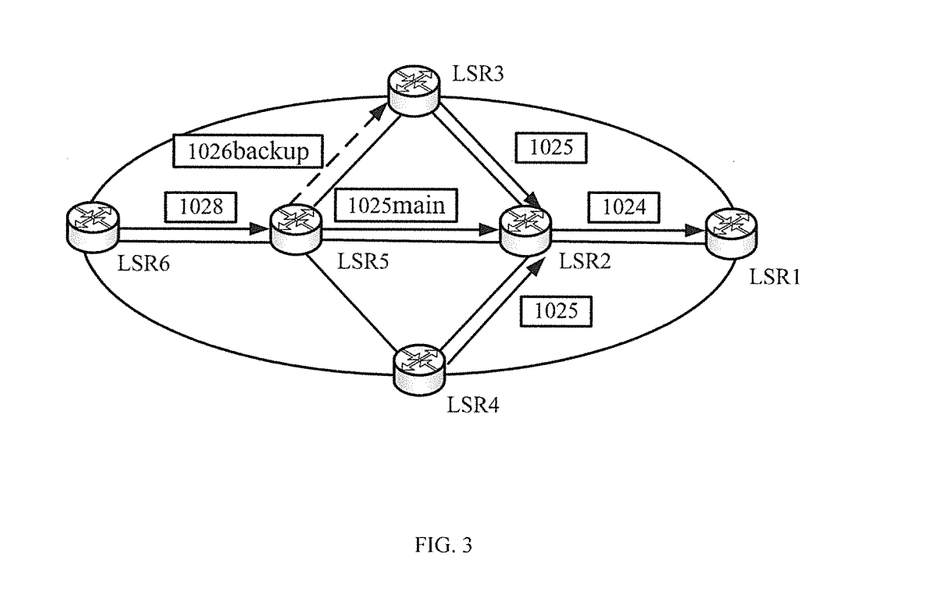
FIG. 3 depicts an example protected LSP and a non-activated backup LSP for a label 1025 in association with the example network of FIG. 1.
Figure 4:
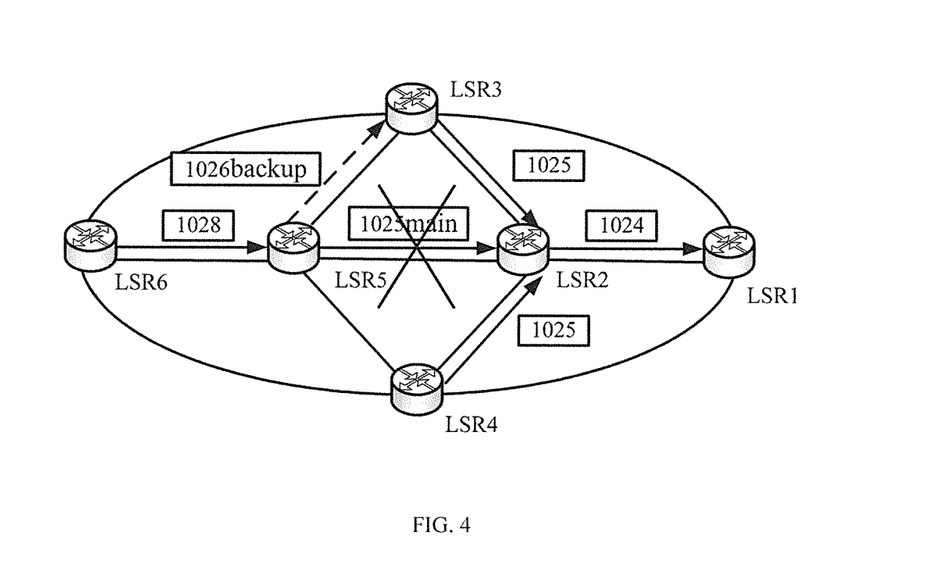
FIG. 4 depicts an activated backup LSP (dotted line) upon failure of a protected LSP (crossed) in association with the example network of FIG. 1.

As shown in FIGS. 2 and 3, the next hop devices of non-optimal routings are LSR3 and LSR4. In this example, LSR3 is set as the node in the backup path set out in the backup table entry. When the protected path from LSR5 to LSR2 defined in the main table entry fails, the backup table entry will be activated and traffic will be diverted to the backup path from LSR5 to LSR3. In this case, the outgoing label of LSR5 is 1026 as stored in pre-defined forwarding table entry.

Figure 5:
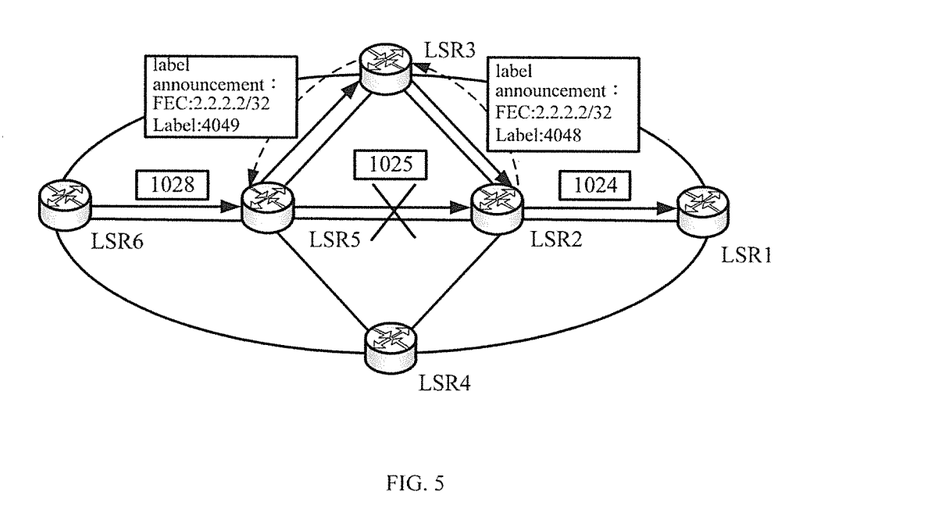
FIG. 5 shows example label announcements in association with the example of FIG. 4.

As shown by dotted arrow lines in FIG. 5, a label announcement comprising a FEC of 2.2.2.2/32 and a label 4048 is sent by LSR2 to LSR3 while a label announcement comprising the same FEC of 2.2.2.2/32 and a different label 4049 is sent by LSR3 to LSR5.

Figure 6:
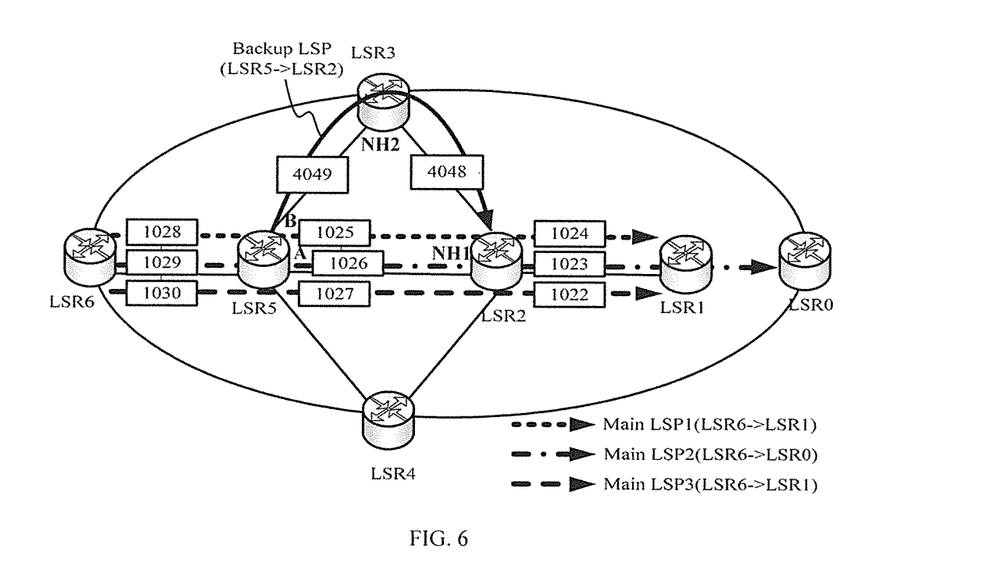
FIG. 6 shows another MPLS network with several protected paths.

Another MPLS network depicted in FIG. 6 comprises a total of 7 LSRs and defines the following:

A first main protected LSP (LSP1) from LSR6 to LSR1,
A second main protected LSP (LSP2) from LSR6 to LSR0,
A third main protected LSP (LSP3) from LSR6 to LSR1,
A backup LSP as represented by a curved arrow line.

Initially, it is necessary to determine a link and a LDP session to be protected. This can be done by, for example, designating the LSR ID of a directly connected downstream node, or specified through an access control list. In this example, it is specified on LSR5 that the link to LSR2 is protected. Accordingly, the LDP session between LSR5 and LSR2 is protected.

Upon successfully establishing an LDP session between the LSR5 and LSR2, the LSP will be in the Operational state. If the session is dependent on one or more Hello adjacencies and only the Link Hello type adjacency is present, the Targeted Hello mechanism will be activated to cooperate with the existing Hello adjacencies such that an LSR session will be maintained upon failure of a protected LSP. To activate the Targeted Hello adjacency on LSR5, the Targeted Hello protection mechanism will send a Targeted Hello message to LSR2. LSR2 will accept the Targeted Hello message from LSR5 by configuration, and then respond to LSR5 using Targeted Hello. As a result, adjacencies of a Targeted Hello type are created on LSR5.

So that an LDP session will not be revoked or terminated when there is no longer any Hello adjacency upon failure of when a protected path failed, the Targeted Hello protocol is used to maintain a current LDP session. For example, there is no Hello adjacency when the Link Hello protocol is no longer in effect. In this case, Hello Adjacency is maintained in the control plane to keep alive an LDP session when a protected path fails.

When a protected link is failed or broken, no more Link Hello message will be received. When this happens, an LDP session as well as the forwarding table entry will be maintained by operation of the Targeted Hello protection mechanism. As long as the Targeted Hello messages can be forwarded through other nodes, the LDP session can be maintained, and the corresponding LSP session will not be deleted. On the other hand, if the Targeted Hello messages cannot be forwarded through other nodes, the link fault will bring about a session interruption. As a result, all LSPs established by that session as well as the forwarding table entries will be deleted. In this example, LSR3 or LSR4 is a bypass node to permit passage of the Targeted Hello message when the protected LSP fails. Although the forwarding tables corresponding to the protected LSPs are not deleted, it will be noted that the mere maintaining of an LSP session and the forwarding tables entry is not sufficient, since the protected link is still blocked.

In order to facilitate traffic diversion through the backup path, it will be necessary to establish a relationship between the main protected path and the backup path. The MPLS forwarding table entries in the present disclosure are organised into a forwarding table entry with at least two levels. The first level forwarding table includes unique information of an individual LSP that is associated with the LSR such as outgoing label and include specific information such as the logical output interface ID and is linked to a second level forwarding table. The second level forwarding table contains information which are common to each protected LSP, and include the output interface and next hop of the protected path. In addition, the second level forwarding table also includes a status flag on whether traffic is to flow through the main protected path or the backup path.

How a predefined backup path is set in an MPLS network will be described below with reference to LSR5 of FIG. 6 and a forwarding table of FIG. 7 as an example.

Figure 7:
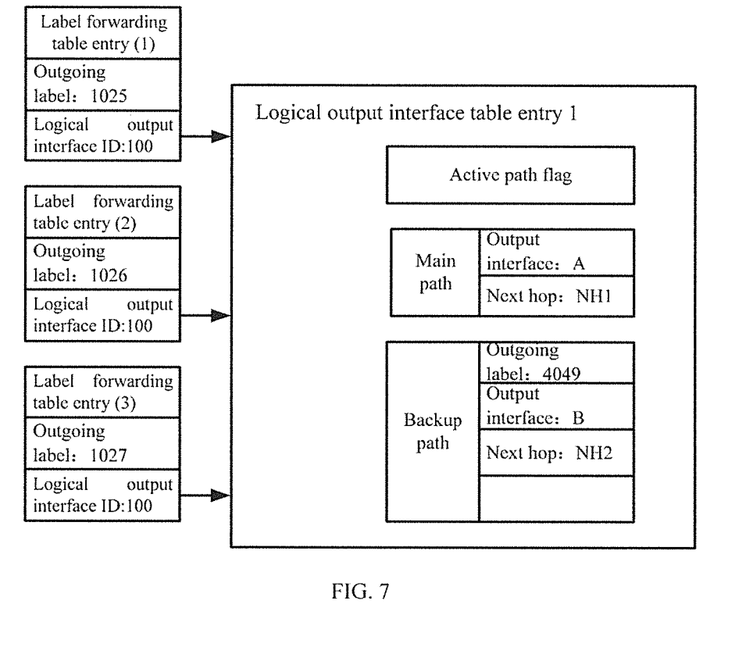
FIG. 7 shows a forwarding table for use with the MPLS network of FIG. 6 to define a backup path, FIG. 8 a forwarding table for use with the MPLS network of FIG. 6 and defining a tunnel type backup path.

FIG. 7 depicts a forwarding table entry of LSR5 that is designed to predefine the backup path of FIG. 6 to permit passage traffic passage through a backup LSP when the protected link between LSR5 and LSR2 failed. The forwarding table entry is represented in two levels. The first level is represented by 3 independent sub-blocks on the left side and the second level is represented by a main block on the right side and marked 'logical output interface table 1'. The main block includes a status flag identified as 'active path flag' in a first sub-block; the output interface and the next hop of the protected (or main) path in the second sub-block; and the outgoing label, the output interface, and the next hop of the backup path in the third sub-block. As shown in FIG. 7, the specified output interface is A and the next hop specified is NH1 for the protected (or main) path for the example of FIG. 6. On the other hand, the outgoing label is 4049, the output interface is B, and the next hop is NH2 for the backup path.

When a message carrying an example label 1028 is received by LSR5, LSR5 will look for a label forwarding table entry using the incoming label 1028 as a key. The first label forwarding entry on the left side of FIG. 7 will be found. This first label forwarding entry (label forwarding table entry (1)) specifies that the outgoing label is 1025 and the outgoing logic interface is 100. The key 100 will then be used to look for a logical output interface table and the logical output interface table entry 1 will be located. LSR5 will then determine when to forward traffic using the main path or the backup path according to the status of the 'active path flag'. Likewise, where the message label is 1029, the label 1029 will be used as a key to search for a label forwarding table entry and label forwarding table entry (2) will be found. Where the message label is 1030, the label 1030 will be used as a key to search for a label forwarding table entry and label forwarding table entry (3) will be found.

Figure 8:
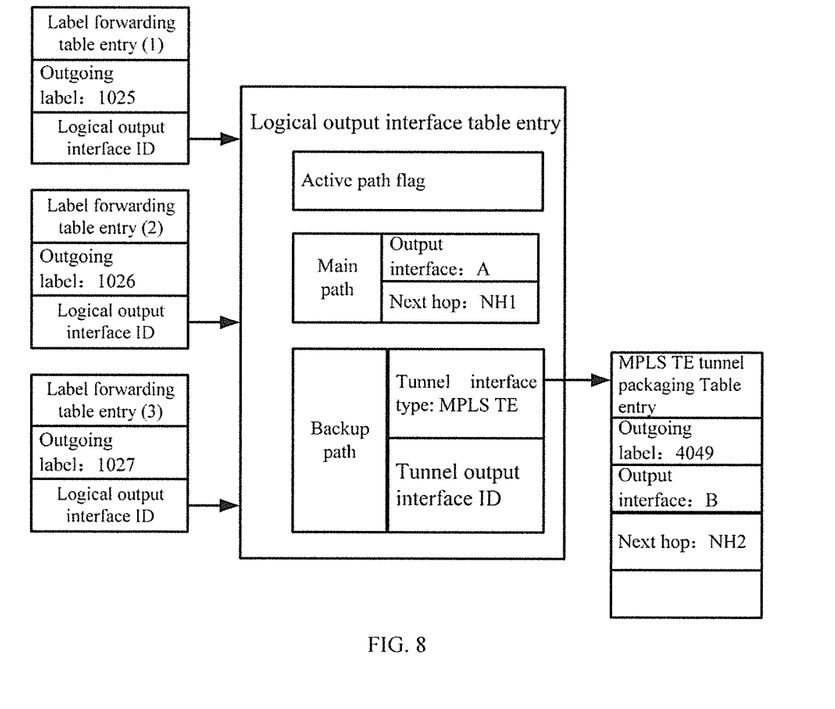

FIG. 8 depicts a forwarding table that is suitable as an alternative to that of FIG. 7 to predefine or preset a backup path of LSR5 of FIG. 6 to permit traffic passage through the backup LSP when the protected link between LSR5 and LSR2 failed. The forwarding table is in three levels. The first level of this forwarding table is represented by 3 independent sub-blocks shown on the left side and contents of the 3 sub-blocks are identical to that of FIG. 7 as a convenient example for illustration. The second level is represented by a main block on the right side and is identified as 'logical output interface table entry'. Similar to that of FIG. 7, the main block includes a status flag identified as 'active path flag' in a first sub-block; and the output interface and the next hop of the protected (or main) path in the second sub-block. Dissimilar to that of FIG. 7, a 'tunnel interface type' entry and a 'tunnel output interface' entry are provided in the third sub-block to define a tunnel type backup path. This third block is also linked to another table identified by a heading 'tunnel packaging table entry'. That another table is the third level of the forwarding table and includes the following table entries: outgoing label, output interface and the next hop.

In this example, the 'tunnel interface type' is an 'MPLS TE' type, the third level table that is linked to the second level block is identified by 'MPLS TE tunnel packaging table entry', the outgoing label is '4049', the output interface is 'B' and the next hop is 'NH2'.

Figure 9:
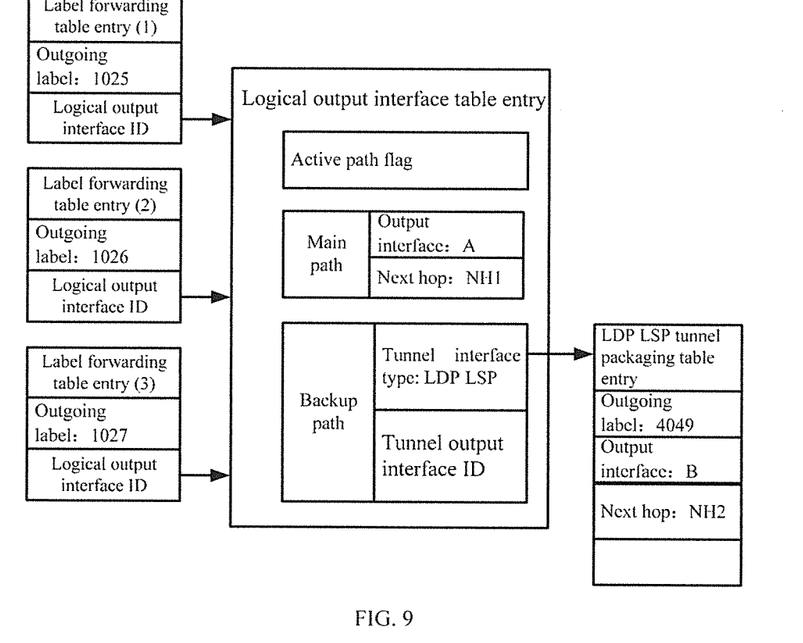
FIGS. 9 and 10 are forwarding table similar to that of FIG. 8 and defining other tunnel type backup paths.

FIG. 9 depicts another 3-level forwarding table that is suitable as an alternative to that of FIG. 8 to predefine or preset a backup path of LSR5 of FIG. 6 to permit traffic passage through the backup LSP when the protected link between LSR5 and LSR2 failed. The forwarding table of FIG. 9 is identical to that of FIG. 8 except that the specified tunnel type is 'LDP LSP', and the another table that is linked to the third block is identified by 'LDP LSP tunnel packaging table entry'.

Figure 10:
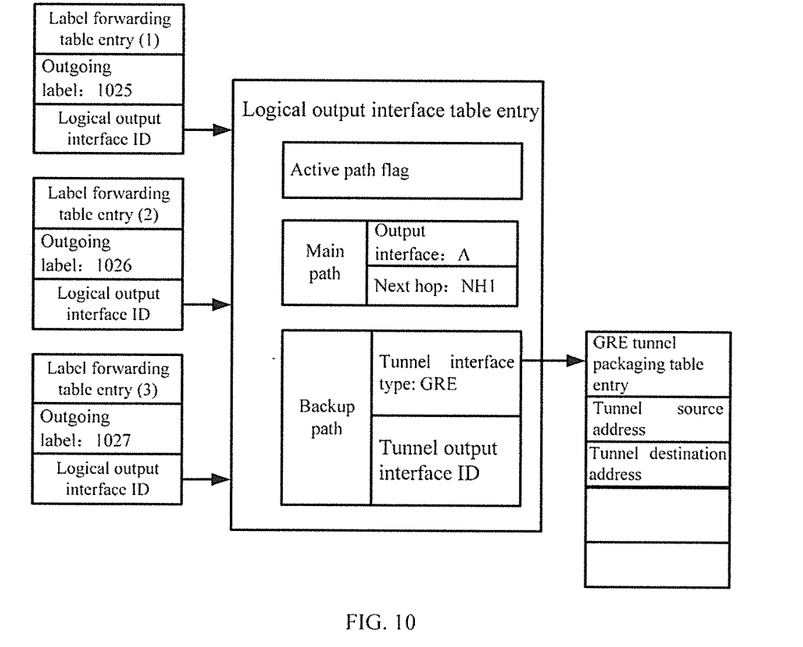

FIG. 10 depicts yet another 3-level forwarding table that is suitable as an alternative to that of FIG. 9 to predefine or preset a backup path of LSR5 of FIG. 6 to permit traffic passage through the backup LSP when the protected link between LSR5 and LSR2 failed. The forwarding table of FIG. 10 is identical to that of FIG. 9 except that the specified tunnel type is 'GRE, and the table that is linked to the third block is identified by 'GRE tunnel packaging table entry' and comprises information of tunnel source address and tunnel destination address.

A tunnel which meets the following criteria can be selected as an appropriate backup path for this example:
1) the destination address of the tunnel is at the LSR ID of LSR2, and
2) the output interface and the next hop of the backup tunnel is different from that of the main protected path.

It will be appreciated without loss of generality that each tunnel will appear as a "tunnel interface" regardless of the type of tunnel, and the main distinction between different tunnel types is the tunnel packaging. For example, both LDP LSP and MPLS TE tunnels require MPLS tunnel packaging, also known as label, while GRE packaging is required for a GRE tunnel.

It will be noted from the above examples that LSPs of different labels but having a common backup path share the same main block identified as 'logical output interface table entry'. The common backup path is indicated by the same logical output ID as depicted in FIG. 7 for example.

In operation, LSR5 will change the status of the 'active path flag' to indicate 'forwarding of traffic by backup path' upon detection of failure on the main protected path is detected. To facilitate switching of traffic from the main protected LSP to the backup LSP, the LSR will firstly find the first level table entry with reference to the incoming labels and then locate second-level forwarding table by means of the logical output interface ID of the first level table entry. The path through which traffic will be forwarded will depend on the status of the 'active path flag'. For example, traffic will be forwarded by the backup path if the status of the 'active path flag' indicates 'forwarding of traffic by backup path'. Alternatively, traffic will be forwarded by the main protected path if the status of the 'active path flag' indicates 'forwarding of traffic by main path'.

It should be noted that the forwarding tables described in the examples above may be stored in a memory of the router (for instance in the forwarding plane).

The invention claimed is:

1. A method of switching data traffic to a predefined backup traffic path by an LSR (label switching router) in an MPLS (multi-protocol label switching) network, wherein the method comprises the LSR upon detection of failure of a protected path during an LDP (label distribution protocol) session:

maintaining an LDP session;

forwarding data traffic via the backup traffic path according to a forwarding table, the forwarding table containing logical output interface information including the outgoing label, the logical output interface, and the next hop of the predefined backup path; and grouping LSPs that are associated with the LSR and having the same logical output interface ID to use a common predefined backup path.

2. A method according to claim 1, wherein the forwarding table comprises a status flag to indicate whether traffic is to be forwarded through a main protected LSP or a backup LSP associated with the LSR.

3. A method according to claim 2, wherein the forwarding table also comprises information on the outgoing label, the logical output interface, and the next hop of the predefined backup path output interface and the next hop of the main protected LSP.

4. A method according to claim 1, wherein the forwarding table comprises label information of LSPs that are associated with the LSR and associated logical output interface ID on the LSR.

5. A method according to claim 1, wherein the backup path comprises either a LSP type or a tunnel type path.

6. A method according to claim 5, wherein the method comprises organizing a two-level forwarding table, wherein the first level forwarding table comprises a plurality of label forwarding table entries each having the same logical output interface ID, and the second level forwarding table comprises information on the outgoing label, the logical output interface, and the next hop of a common predetermined backup path where the backup path is an LSP type; and wherein each one of the plurality of label forwarding table entries output of the first level forwarding table is linked to the second level forwarding table.

7. A method according to claim 5, wherein the method comprises organizing a three-level forwarding table, wherein the first level forwarding table comprises a plurality of label forwarding table entries each having the same logical output interface ID; the second level forwarding table comprises information on the tunnel type and tunnel output ID where the backup path is a tunnel type; and the third level forwarding table comprises tunnel packaging table entry including information on the outgoing label, output interface and the next hop of the tunnel; and wherein each one of the plurality of label forwarding table entries output of the first level forwarding table is linked to the second level forwarding table, and the second level forwarding table is linked to the third level forwarding table.

8. A method according to claim 5, wherein the method comprises organizing a three-level forwarding table, wherein the first level forwarding table comprises a plurality of label forwarding table entries each having the same logical output interface ID; the second level forwarding table comprises information on the tunnel type and tunnel output ID where the backup path is a tunnel type; and the third level forwarding table comprises tunnel packaging table entry including information on the source address and destination address of the tunnel; and wherein each one of the plurality of label forwarding table entries output of the first level forwarding table is linked to the second level forwarding table, and the second level forwarding table is linked to the third level forwarding table.

9. A method according to claim 1, wherein the method comprises maintaining the LDP session in the control plane.

10. A method according to claim 1, wherein the method comprises maintaining the LDP session by means of Targeted Hello messages.

11. A label switching router (LSR) for use in an MPLS network, the router comprising a processor upon detection of failure of a protected path during an LDP (label distribution protocol) session to execute stored instructions:

to maintain an LDP session;

to forward data traffic via the backup traffic path according to a forwarding table, the forwarding table containing logical output interface information including the outgoing label, the logical output interface, and the next hop of the predefined backup path, wherein the forwarding table comprises label information of LSPs that are associated with the LSR and associated logical output interface ID on the LSR; and to group LSPs that are associated with the LSR and having the same logical output interface ID to use a common predefined backup path.

12. An LSR according to claim 11, wherein the LSR is to maintain the LDP session in the control plane using Targeted Hello messages.

13. An LSR according to claim 11, wherein the LSR is to set a status flag in the forwarding table to indicate whether traffic is to be forwarded through a main protected LSP or a backup LSP associated with the LSR.

14. An LSR according to claim 13, wherein the LSR is to set the forwarding table to include information on the outgoing label, the logical output interface, and the next hop of the predefined backup path output interface and the next hop of the main protected LSP.

15. An LSR according to claim 11, wherein the LSR is to compile the forwarding table in advance to include label information of LSPs that are associated with the LSR and associated logical output interface ID on the LSR.

16. An LSR according to claim 11, wherein the LSR is to form the backup path as an LSP path or a tunnel type path.

17. A method of switching data traffic to a predefined backup traffic path by an LSR (label switching router) in an MPLS (multi-protocol label switching) network, wherein the method comprises the LSR upon detection of failure of a protected path during an LDP (label distribution protocol) session:

maintaining an LDP session;

forwarding data traffic via the backup traffic path according to a forwarding table, the forwarding table containing logical output interface information including the outgoing label, the logical output interface, and the next hop of the predefined backup path, wherein the backup path comprises either a LSP type or a tunnel type path; and organizing a two-level forwarding table, wherein the first level forwarding table comprises a plurality of label forwarding table entries each having the same logical output interface ID, and the second level forwarding table comprises information on the outgoing label, the logical output interface, and the next hop of a common predetermined backup path where the backup path is an LSP type; and wherein each one of the plurality of label forwarding table entries output of the first level forwarding table is linked to the second level forwarding table.

18. The method according to claim 17, further comprising: maintaining the LDP session in the control plane.

\* \* \* \* \*